United States Patent Office 3,651,051
Patented Mar. 21, 1972

---

3,651,051
BENZO[b]BENZOFURANO[2,3-e]OXEPINES
Fernand Binon, Strombeek-Bever, and Marcel Louis Victor Descamps, Crainhem, Belgium, assignors to Laboratoires Labaz, Paris, France
No Drawing. Filed Dec. 18, 1969, Ser. No. 886,388
Claims priority, application Great Britain, Dec. 20, 1968, 60,855/68
Int. Cl. C07d 51/70
U.S. Cl. 260—240 TC    3 Claims

ABSTRACT OF THE DISCLOSURE

Novel serotonin and histamine antagonists of the formula

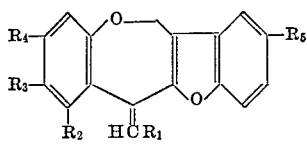

wherein $R_1$ is β-dimethylaminoethyl, β-dimethylaminoisopropyl, β-piperidinoethyl, ethyl-β-(4-methylpiperazino), methyl-(1-methyl-2-piperidyl) or 1-methyl-3-piperidyl; $R_2$ is hydrogen or methyl; $R_3$ is hydrogen, chlorine, methyl or methoxy; $R_4$ is hydrogen or methyl and $R_5$ is hydrogen, chlorine or methoxy.

BACKGROUND OF THE INVENTION

Field of the invention

The invention relates to novel benzo [b] benzofurano [2,3-e]oxepine derivatives and a process for producing same.

Prior art

Certain compounds are known to possess anti-serotonin and antihistamine activity. Among these compounds is 10 - [2-(dimethylamino)-propyl]-N,N-dimethylphenothiazine-2-sulfonamide.

DETAILED DESCRIPTION OF THE INVENTION

This invention relates to novel benzo [b] benzofurano [2,3-e] oxepine derivatives and to a process for preparing said compounds.

The benzo [b] benzofurano [2,3-e] oxepine derivatives with which the invention is concerned are represented by the formula:

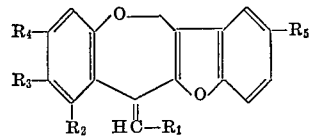

wherein $R_1$ is β-dimethylaminoethyl, β-dimethylaminoisopropyl, β-piperidinoethyl, ethyl-β-(4-methylpiperazino), methyl-(1-methyl-2-piperidyl) or 1-methyl-3-piperidyl; $R_2$ is hydrogen or methyl; $R_3$ is hydrogen, chlorine, methyl or methoxy; $R_4$ is hydrogen or methyl and $R_5$ is hydrogen, chlorine or methoxy. The compounds of Formula I form acid addition salts with inorganic and organic acids such as hydrochloric and oxalic acids and hence the invention includes within its scope all pharmaceutically acceptable acid addition salts of the compounds of Formula I.

The compounds of Formula I are prepared by reacting in a suitable ether such as, for example, tetrahydrofuran; diethyl ether, propyl ether, isopropyl ether or butyl ether, a 6-oxo-benzo [b] benzofurano [2,3-e] oxepine of the formula:

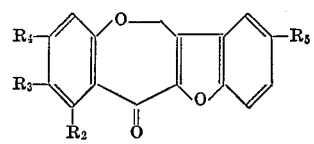

wherein $R_2$, $R_3$, $R_4$ and $R_5$ are as defined above with respect to Formula I; with a halo-magnesium organic compound of the formula:

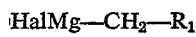

wherein Hal is chlorine or bromine and $R_1$ as defined above to form a magnesium organic derivative which is hydrolyzed to form a 6-hydroxy-oxepine derivative of the formula:

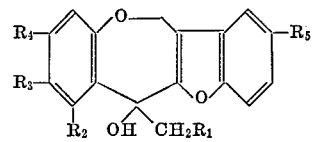

wherein $R_1$, $R_2$, $R_3$, $R_4$ and $R_5$ are as defined above.

The compounds of Formula III are then reacted with a dehydrating agent such as a strong acid, for example, sulphuric acid, hydrochloric acid, phosphoric acid or p-toluenesulphonic acid, or an inorganic or organic acid chloride, for example, thionyl chloride, acetyl chloride or tosyl chloride, to form the corresponding 6-methylidene derivative (i.e. the corresponding compound of Formula I), which may then be reacted with an appropriate organic or inorganic acid to provide a pharmaceutically acceptable acid addition salt of the compound of Formula I.

The starting compound represented by Formula II may be prepared by reacting an ethyl-3-bromomethyl-coumarylate of the formula:

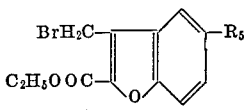

wherein $R_5$ is as defined above, with a phenol of the formula:

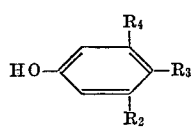

wherein $R_2$, $R_3$ and $R_4$ are as defined above, to form the corresponding ethyl-3-phenoxymethyl-coumarylate which, after saponification with, for example, a hydroalcoholic solution of potassium hydroxide, yields a 3-phenoxymethyl-coumarilic acid of the formula:

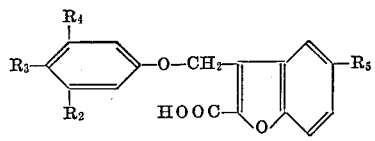

wherein $R_2$, $R_3$, $R_4$ and $R_5$ are as defined above.

The compound of Formula VI may then be converted to its corresponding acid chloride by means of, for example, thionyl chloride and directly cyclized, for example, in an appropriate solvent such as dichlorethane at a temperature below 20° C. and in the presence of stannic chloride to form the corresponding 6-oxo-benzo[b]benzofurano[2,3-e]oxepine represented by Formula II.

The compound of Formula IV in which $R_5$ is hydrogen is a known compound. Those in which $R_5$ is chlorine or methoxy may be prepared by the method described in Helv. Chim. Acta, 31, 78, 1948, from ethyl-3-methylcoumarylate. The compounds of Formula V are also known compounds.

The compounds of the present invention have been unexpectedly found to possess valuable pharmacological activity. It has been observed that compounds of the invention are antagonistic to serotonin and histamine which are considered as playing a biochemical role in the generation and maintenance of cephalalgia of various origins and, in particular, migraine. This indicates that compounds of the invention possess the necessary biochemical properties to render them valuable agents in the treatement of such pathological conditions.

In addition to this fairly specific activity, pharmacological trials have shown that the compounds of the invention possess antalgic properties, probably due in part to an action on the central nervous system which render them useful in the treatment of a broader variety of pain. Animals which had been dosed with compounds of the invention show a markedly diminished reaction to painful stimuli as compared with untreated animals.

Finally, it has been observed that the compounds of the invention possess an antiemetic activity which constitutes a valuable adjunct to the antalgic properties already mentioned.

Compounds which are particularly useful in this field are 6 - (3 - dimethylaminopropylidene)-benzo[b]benzofurano[2,3-e]oxepine (in the form of its fumarate) and 6-(3-piperidinopropylidene) - benzo[b]benzofurano[2,3-e]oxepine (in the form of its oxalate).

Pharmacological tests were performed with these two compounds to determine their inhibitory effects on serotonin and histamine. For the purpose of these tests the compound corresponding to the formula: 6-(3-dimethylaminopropylidene) - benzo[b]benzofurano[2,3-e]oxepine fumarate is herein designated as Compound A, while that corresponding to the formula: 6-(3-piperidinopropylene)-benzo[b]benzofurano[2,3 - e]oxepine oxalate is herein designated as Compound B.

To provide a basis for comparison with the prior art, the same tests were performed with a well-known substance recognized as possessing anti-serotonin and anti-histamine activity and which is particularly useful in the treatment of conditions characterized by migraine. The substance selected for this purpose was the following:

10-[2-(dimethylamino)propyl]-N,N-dimethylphenothiazine-2-sulfonamide (hereinafter referred to as Compound C).

For the anti-serotonin test, the technique of Gaddum and Hameed was employed whereby an isolated rat uterus was placed in a 50 ml. bath of Locke's solution and different doses of serotonin applied in order to determine the dose at which a reasonably intense spasm of the uterus was obtained. Subsequent trials were then made with each of the compounds to be tested in order to ascertain what concentration of each compound was required in the bath to reduce by 50% the spasm provoked by the previously determined dose of serotonin ($AD_{50}$). The results of the test are based on two factors namely the intensity and the duration of the anti-spasmodic effect.

This test showed that both Compounds A and B possess an anti-serotonin activity which is approximately one-and-a-half times that of Compound C. Furthermore, the duration of the action of Compounds A and B was found to be twice as long as that of Compound C (two hours vs. one hour).

For the anti-histamine test, McKeon's technique was used in vivo on the guinea pig. According to this technique, intravenous doses of histamine were administered to guinea pigs until the dose required to kill an animal within three minutes was determined. Subsequently, this dose was administered intravenously to other guinea pigs simultaneously with varying doses of the compound to be tested in order to find out how much of the latter was required to prevent death occurring over a period of six minutes in 50% of the animals ($AD_{50}$).

It was found that the $AD_{50}$ of Compound A was approximately one-third of that of Compound C, while the $AD_{50}$ of Compound B was five times the value of Compound C. This test showed that both Compounds A and B, and particularly Compound A, are active anti-histaminics.

Finally, antalgic tests of a purely physiological nature were performed according to the technique of Lund Nilsen. For these tests, male mice were used and two electrodes were inserted subcutaneously into their tails near the extremity. The required voltage to produce a painful reaction was determined for each animal. Varying doses of the compound to be tested were then given by intragastric intubation to the mice until the average dose required to suppress the painful reaction in 50% of the animals was determined ($AD_{50}$).

It was found that the $AD_{50}$ for Compound A was 12 mg./kg. of body-weight and for Compound B 75 mg./kg., while that for Compound C was 80 mg./kg. These results show that Compound A exerts an antalgic effect which is approximately seven times that of Compound C, while Compound B is slightly superior to Compound C.

Since the compounds of Formula I are normally oily liquids, it will be appreciated that for therapeutic use the pharmaceutically acceptable acid addition salts of the compound of Formula I are advantageously used rather than the free bases.

It will be appreciated that for therapeutic use the compounds of the invention will normally be administered in the form of a pharmaceutical composition comprising as an essential active ingredient a compound of Formula I, in association with a pharmaceutical carrier therefor. The carrier may be a solid or liquid diluent or excipient of the kind normally employed in the production of medicaments ready for use, for example, lactose, potato starch, talc, magnesium stearate, gelatine, sodium chloride or distilled water.

The composition may be made up in a form suitable for any desired mode of administration, which may be by the oral or parenteral route. Advantageously, for clinical use, the composition is made up in a dosage unit form adapted for the desired mode of administration.

The dosage unit may be, for example, a tablet, pill, packaged powder, capsule, syrup or drops for oral administration or a suppository or a sterile solution packaged in a sealed container such as an ampoule for parenteral administration. The amount of active ingredient in each dosage unit will be such that one or more units are required for each therapeutic administration.

The following examples illustrate the invention:

EXAMPLE 1

(a) Preparation of 3-phenoxymethyl-coumarylic acid (Formula VI)

In a 3-liter flask equipped with a stirrer, a vertical condenser and a dropping-funnel, 93.20 g. of phenol (Formula V) were dissolved in 270 ml. of methyl ethyl ketone. To this solution were added 1.8 g. of potassium iodide 2 ml. of dimethylformamide and, while stirring, 136.8 g. of finely ground potassium carbonate. The mixture so obtained was heated under reflux for 30 minutes. Without cooling, a solution consisting of 255 g. of ethyl-3-bromomethylcoumarylate (Formula IV) in 630 ml. of methyl ethyl ketone was allowed to flow through the dropping-funnel.

The reaction medium was heated under reflux for 6 hours. It was then cooled and the inorganic precipitate filtered off and washed with methyl ethyl ketone.

The organic fractions were collected and the solvent was evaporated to yield 306 g. of an oily residue which was saponified by heating under reflux with a solution of 118.8 g. of 85% potassium hydroxide in 600 ml. of 50% aqueous ethanol.

The resultant solution was cooled and then acidified by means of hydrochloric acid. The precipitate which formed was filtered out, washed over a filter with water and dried in a drying-oven at a temperature of 60° C.

In this manner 224 g. of 3-phenoxymethyl-coumarylic acid were obtained (M.P. 194–196° C.; M.P. from isopropanol; 199° C.), which represents a yield of 92.9%.

The following compounds of Formula VI were prepared in a manner analogous to that described above by reacting the appropriate compound of Formula IV with the required substitued phenol of Formula V.

| Compound: | Melting point, ° C. |
|---|---|
| 3-(3,5-methyl - 4 - chloro-phenoxymethyl)-coumarylic acid | 210–213 |
| 3 - (4 - methyl-phenoxymethyl)-coumarylic acid | 170–172 |
| 3-(4-chloro - phenoxymethyl) - coumarylic acid | 194–196 |
| 3 - (4-methoxy-phenoxymethyl)-coumarylic acid | 184–185 |
| 3-(4-methyl-phenoxymethyl) - 5 - methoxy-coumarylic acid | 199–200 |
| 3 - (4 - methyl-phenoxymethyl) - 5 - chloro-coumarylic acid | 220–221 |

(b) Preparation of 6-oxo-benzo[b]benzofurano[2,3-e] oxepine (Formula II)

In a 10-liter flask equipped with a stirrer and a dropping-funnel, 142 g. of the recrystallized 3-phenyoxymethyl-coumarylic acid prepared as described in (a) were suspended in 1000 ml. of thionyl chloride containing 2 ml. of dimethylformamide.

The suspension was stirred for 24 hours at a temperature of 20° C., which gave a clear solution. The thionyl chloride was then evaporated under vacuum and the solid residue comprising 138 g. of 3-phenoxymethyl-coumarylic acid chloride, was dissolved in 1820 ml. of dichlorethane.

The solution so obtained was poured through the dropping-funnel into the flask to which 225 g. of stannic chloride dissolved in 1820 ml. of dichloroethane had been previously added. During this operation, the temperature was maintained at −5° C., after which it was brought up to between −5 and 0° C. for 1 hour and finally to 20° C. for 20 hours.

At the end of this time, the temperature was reduced and maintained at 0° C. and a 5% aqueous solution of hydrochloric acid was added in order to decompose the organic complex so formed. The organic solution obtained was decanted, washed with water, then with a 2% aqueous solution of potassium carbonate and again with water. The organic fraction was dried over anhydrous sodium sulphate and the solvent was evaporated under vacuum to give 111 g. of crude 6-oxo-benzo[b]benzofurano-[2,3-e]oxepine. This crude product was recrystallized from 350 ml. of tetrahydrofuran, which provided a first fraction of 60 g. and a second fraction of 10 g. of pure 6-oxo-benzo[b]benzofurano[2,3-e]oxepine, melting at 152° C. (yield: 58%).

By using the procedure described above but with different starting products corresponding to Formula VI, the following compounds of Formula II were prepared:

| Compound: | Melting point, ° C. |
|---|---|
| 8-methyl - 6 - oxo - benzo[b]benzofurano-[2,3-e]oxepine | 209–210 |
| 8-chloro - 7,9 - methyl - 6 - oxo-benzo[b]-benzofurano[2,3-e]oxepine | 264–265 |
| 8 - chloro - 6 - oxo - benzo[b]benzofurano-[2,3-e]oxepine | 255–257 |
| 8 - methoxy - 6 - oxo-benzo[b]benzofurano-[2,3-e]oxepine | 143–144 |
| 8-methyl - 6 - oxo - 2 - methoxy-benzo[b]benzofurano[2,3-e]oxepine | 199 |
| 8-methyl - 6 - oxo-2-chloro-benzo[b]benzofurano[2,3-e]oxepine | 244 |

(c) Preparation of 6-(3-dimethylaminopropyl)-6-hydroxy-benzo[b]benzofurano[2,3-e]oxepine (Formula III)

In a 250 ml. flask equipped with a vertical condenser, a dropping-funnel, a dip thermometer and a stirrer, 1.5 g. of magnesium turnings and a crystal of iodine were heated until vaporization of the iodine and then cooled, after which 20 ml. of dry tetrahydrofuran were added.

The mixture was heated under reflux and a solution of 0.2 g. of ethyl iodide in 5 ml. of dry tetrahydrofuran was allowed to flow into the reaction medium. When the reaction started, a solution of 6.2 g. of γ-dimethylamino-propyl chloride in 20 ml. of dry tetrahydrofuran was added and the mixture so obtained was heated under reflux until the complete disappearance of the magnesium turnings. The reaction medium was then cooled in an ice bath, after which there was added thereto a solution in 45 ml. of tetrahydrofuran of 7 g. of 6-oxo-benzo[b]benzofurano[2,3-e]oxepine prepared as described in (b).

The reaction mixture was allowed to stand for 20 hours at a temperature of 20° C., and was then poured into a saturated aqueous solution of ammonium chloride maintained at a temperature of 5° C.

The mixture was extracted with ether and the organic portion was washed and dried over anhydrous sodium sulphate. After evaporation of the solvent, 9.4 g. of crude product were obtained, which after recrystallization from isopropanol, provided 6.7 g. of pure 6-(3-dimethylaminopropyl) - 6-hydroxy-benzo[b]benzofurano[2,3-e]oxepine, melting at 160° C. (yield: 71%).

By following the procedure described above, but using the appropriate halomagnesium organic compound and the requisite compound of Formula II, the oxepines of Formula III listed hereunder were prepared:

| Compound | Melting point, ° C. |
|---|---|
| 6-(3-piperidinopropyl)-6-hydroxy-benzo[b]benzofurano[2,3-e]oxepine | 162–163 |
| 7,9-methyl-8-chloro-6-(3-dimethylaminopropyl)-6-hydroxy-benzo[b]benzofurano[2,3-e]oxepine | 168–169 |
| 7,9-methyl-8-chloro-6-(3-dimethylamino-2-methyl-propyl)-6-hydroxy-benzo[b]benzofurano[2,3-e]oxepine | 164–166 |
| 7,9-methyl-8-chloro-6-(3-piperidinopropyl)-6-hydroxy-benzo[b]benzofurano[2,3-e]oxepine | 110–111 |
| 8-methyl-6-(3-dimethylaminopropyl)-6-hydroxy-benzo[b]benzofurano[2,3-e]oxepine | 146–147 |
| 8-methyl-6-(3-dimethylamino-2-methyl-propyl)-6-hydroxy-benzo[b]benzofurano[2,3-e]oxepine | 181.5–183 |
| 8-chloro-6-(3-dimethylaminopropyl)-6-hydroxy-benzo[b]benzofurano[2,3-e]oxepine | 153–154 |
| 8-chloro-6-(3-dimethylamino-2-methyl-propyl)-6-hydroxy-benzo[b]benzofurano[2,3-e]oxepine | 173–174 |
| 8-methyl-6-(3-dimethylaminopropyl)-6-hydroxy-2-methoxy-benzo[b]benzofurano[2,3-e]oxepine | 151–152 |

(d) Preparation of 6 - (3 - dimethylaminopropylidene)-benzo[b]benzofurano[2,3-e]oxepine and its fumarate (Formula I)

In an Erlenmeyer flask 6.2 of 6-(3-dimethylaminopropyl)-6-hydroxy-benzo[b]benzofurano[2,3-e]oxepine prepared as described in (c) were dissolved in 108 ml. of a 10% solution of sulphuric acid. The solution obtained was heated to boiling point for 15 minutes. After cooling, 100 ml. of chloroform were added and the solution was made alkaline with a 5% solution of sodium hydroxide.

The solution was then extracted with chloroform, washed with water and dried over anhydrous sodium sulphate. The solvent was evaporated and the resulting oily residue composed of 6-(3-dimethylaminopropylidene)-benzo[b]benzofurano[2,3-e]oxepine was then directly treated with a solution of fumaric acid in isopropanol to give 6.5 g. of 6-(3-dimethylaminopropylidene)-benzo[b]benzofurano[2,3-e]oxepine fumarate (yield: 85%). The fumarate had a melting point of 160° C. when recrystallized from isopropanol.

Following the method described above, the following compounds of Formula I were prepared from the appropriate compound of Formula III.

| Compound | Melting point, ° C. |
|---|---|
| 8-chloro-7,9-methyl-6-(3-dimethylaminopropylidene)-benzo[b]benzofurano[2,3-e]oxepine | [1] 167–170 |
| 8-chloro-6-(3-dimethylaminopropylidene)-benzo[b]benzofurano[2,3-e]oxepine | [1] 179–180 |
| 8-methyl-6-(3-dimethylaminopropylidene)-benzo[b]benzofurano[2,3-e]oxepine | [1] 160–162 |
| 8-methoxy-6-(3-dimethylaminopropylidene)-benzo[b]benzofurano[2,3-e]oxepine | [1] 125–128 |
| 8-methyl-6-(3-dimethylaminopropylidene)-2-methoxy-benzo[b]benzofurano[2,3-e]oxepine | [1] 118–122 |
| 6-(3-dimethylamino-2-methyl-propylidene)-benzo[b]benzofurano[2,3-e]oxepine | [1] 208–210 |
| 8-chloro-7,9-methyl-6-(3-dimethylamino-2-methyl-propylidene)-benzo[b]benzofurano[2,3-e]oxepine | [1] 196–197 |
| 8-methyl-6-(3-dimethylamino-2-methyl-propylidene)-benzo[b]benzofurano[2,3-e]oxepine | [1] 162–163.5 |
| 6-(3-piperidinopropylidene)-benzo[b]benzofurano[2,3-e]oxepine | [1] 199–201 |
| 8-chloro-7,9-methyl-6-(3-piperidinopropylidene)-benzo[b]benzofurano[2,3-e]oxepine | [1] 210–211 |
| 8-chloro-6-(3-piperidinopropylidene)-benzo[b]benzofurano[2,3-e]oxepine | [1] 208–210 |
| 8-methyl-6-(3-piperidinopropylidene)-benzo[b]benzofurano[2,3-e]oxepine | [1] 192–193 |
| 8-methoxy-6-(3-piperidinopropylidene)-benzo[b]benzofurano[2,3-e]oxepine | [1] 213–214 |
| 8-methyl-6-(3-piperidinopropylidene)-2-methoxy-benzo[b]benzofurano[2,3-e]oxepine | [1] 200–202 |
| 8-chloro-7,9-methyl-6[2-(2-N-methylpiperidyl)-ethylidene]-benzo[b]benzofurano[2,3-e]oxepine | [1] 185–186 |
| 6-[(3-N-methylpiperidyl)-methylidene]-benzo[b]benzofurano[2,3-e]oxepine | [1] 203–206 |
| 8-methyl-6-[(3-N-methylpiperidyl)-methylidene]-benzo[b]benzofurano[2,3-e]oxepine | [1] 232–234 |
| 8-methyl-6[(3-N-methylpiperidyl)-methylidene]-2-methoxy-benzo[b]benzofurano[2,3-e]oxepine | [1] 245–249 |
| 6-[3-(N-methylpiperazino)-propylidene]-benzo[b]benzofurano[2,3-e]oxepine | [2] 246–250 |
| 8-chloro-7,9-methyl-6-[3-(N-methylpiperazino)-propylidene]-benzo[b]benzofurano[2,3-e]oxepine | [2] 247–249 |
| 8-methyl-6-[3-(N-methylpiperazino)-propylidene]-benzo[b]benzofurano[2,3-e]oxepine | [2] 250–252 |
| 8-methyl-6-[3-(N-methylpiperazino)-propylidene]-2-methoxy-benzo[b]benzofurano[2,3-e]oxepine | [2] 261–263 |
| 8-methyl-6-[3(N-methylpiperazino)-propylidene]-2-chloro-benzo[b]benzofurano[2,3-e]oxepine | [2] 268–270 |

[1] Oxalate.  [2] Dihydrochloride.

EXAMPLE 2

Tablets were prepared by granulating and compressing the following ingredients in accordance with known pharmaceutical techniques:

| Ingredient: | Mg. per tablet |
|---|---|
| 6-(3-dimethylaminopropylidene)-benzo[b]benzofurano[2,3-e]oxepine fumarate | 40 |
| Milk sugar | 100 |
| Cornstarch | 43 |
| Gelatine | 5 |
| Alginic acid | 4 |
| Talc | 6 |
| Silicic acid | 1 |
| Magnesium stearate | 1 |
|  | 200 |

What is claimed is:

1. A benzo[b]benzofurano[2,3-e]oxepine derivative having the general formula:

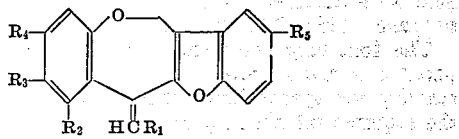

wherein $R_1$ is selected from the group consisting of β-dimethylaminoethyl, β-dimethylaminoisopropyl, β-piperidinoethyl, ethyl-β-(4-methylpiperazino), methyl-(1-methyl-2-piperidyl) and 1-methyl-3-piperidyl; $R_2$ is selected from the group consisting of hydrogen and methyl; $R_3$ is selected from the group consisting of hydrogen, chlorine, methyl and methoxy; $R_4$ is selected from the group consisting of hydrogen and methyl and $R_5$ is selected from the group consisting of hydrogen, chlorine and methoxy and the pharmaceutically acceptable acid addition salts thereof.

2. A compound according to claim 1 which is 6-(3-dimethylaminopropylidene)-benzo[b]benzofurano[2,3-e]oxepine and its pharmaceutically acceptable acid addition salts.

3. A compound according to claim 1 which is 6-(3-piperidinopropylidene)-benzo[b]benzofurano[2,3-e]oxepine and its pharmaceutically acceptable acid addition salts.

References Cited
UNITED STATES PATENTS 3,420,851    1/1969    Bloom et al. _____ 260—333

HENRY R. JILES, Primary Examiner

G. T. TODD, Assistant Examiner

U.S. Cl. X.R.

260—346.2 R, 346.2 M; 424—250, 267, 285